(12) United States Patent
Yamashita

(10) Patent No.: US 10,715,061 B2
(45) Date of Patent: Jul. 14, 2020

(54) MOTOR CONTROL DEVICE

(71) Applicant: AISIN SEIKI KABUSHIKI KAISHA, Kariya-shi, Aichi-ken (JP)

(72) Inventor: Kenji Yamashita, Kariya (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 0 days.

(21) Appl. No.: 16/382,254

(22) Filed: Apr. 12, 2019

(65) Prior Publication Data

US 2019/0348932 A1   Nov. 14, 2019

(30) Foreign Application Priority Data

May 11, 2018   (JP) ................... 2018-092247

(51) Int. Cl.
| | |
|---|---|
| *H02K 29/06* | (2006.01) |
| *H02P 6/10* | (2006.01) |
| *H02P 1/30* | (2006.01) |
| *H02P 6/08* | (2016.01) |
| *H02P 29/50* | (2016.01) |
| *H02P 4/00* | (2006.01) |

(52) U.S. Cl.
CPC .................. *H02P 6/10* (2013.01); *H02P 1/30* (2013.01); *H02P 4/00* (2013.01); *H02P 6/08* (2013.01); *H02P 29/50* (2016.02)

(58) Field of Classification Search
CPC ........ H02P 23/0077; H02P 6/28; H02P 29/50; H02P 6/10
See application file for complete search history.

(56) References Cited

U.S. PATENT DOCUMENTS

2009/0312142 A1* 12/2009 Minamikawa .. B60W 30/18136
477/5

FOREIGN PATENT DOCUMENTS

| JP | 2004032953 A | 1/2004 |
|---|---|---|
| JP | 2018121500 A | 8/2018 |

* cited by examiner

*Primary Examiner* — Karen Masih
(74) *Attorney, Agent, or Firm* — Buchanan Ingersoll & Rooney PC

(57) ABSTRACT

A motor control device includes: a PWM controller that PWM-controls an inverter driving a three-phase motor and including three arm portions, each including a high-side switching element and a low-side switching element connected in series with each other between a first power supply line and a second power supply line connected to a potential lower than a potential of the first power supply line. In an energizing period and a non-energizing period in a case where the three-phase motor is energized from the first power supply line through the PWM-control of the inverter, during a first predetermined period in the energizing period immediately before transition from the energizing period to the non-energizing period, the PWM controller performs a SWEEP of a signal applied to one of the high-side switching element and the low-side switching element, and performs a synchronous rectification control.

6 Claims, 4 Drawing Sheets

MOTOR CONTROL DEVICE

CROSS REFERENCE TO RELATED APPLICATIONS

This application is based on and claims priority under 35 U.S.C. § 119 to Japanese Patent Application 2018-092247, filed on May 11, 2018, the entire contents of which are incorporated herein by reference.

TECHNICAL FIELD

This disclosure relates to a motor control device including a PWM controller that PWM-controls an inverter. The inverter drives a three-phase motor, and includes three arm portions each of which includes a high-side switching element and a low-side switching element connected in series between a first power supply line and a second power supply line connected to a potential lower than a potential of the corresponding first power supply line.

BACKGROUND DISCUSSION

When a three-phase brushless motor (hereinafter, referred to as a "three-phase motor") is driven, a PWM-control has been used in the related art. In the PWM-control, when the magnitude of a current flowing through the three-phase motor (motor drive current) suddenly changes, a motor torque also suddenly changes, and thus in some cases, a noise occurs according to a sudden change of the motor torque. Therefore, a technique of suppressing the noise has been examined (e.g., JP2004-032953A (Reference 1)).

In a motor drive device described in Reference 1, when a PWM-control is performed by a PWM signal, in a period before switching from a high impedance state to a low impedance output state, as a period less than ½ of a high impedance state section, and in a period after switching from the low impedance output state to the high impedance state, as a period less than ½ of a high impedance state section, a change of a motor drive current is gently made through a SWEEP control of a DUTY ratio, so that a noise reduction is executed.

As in the technique described in Reference 1, in the period before switching from the high impedance state to the low impedance output state or in the period after switching from the low impedance output state to the high impedance state, a SWEEP control of the DUTY ratio has not only an effect of noise reduction, but also an effect of suppressing a surge that occurs after switching from the low impedance output state to the high impedance state. Meanwhile, as a method of executing a noise reduction, a method of extending an energizing time from a 120-degree energization drive of the related art and approaching a 150-degree energization drive or sinusoidal wave drive has recently been employed. However, in a three-phase motor controlled in a sensorless manner, when an energizing time is extended from a 120-degree energization drive, a position detecting period during which a position of a rotor is detected becomes shorter, and further, the surge becomes larger, so that it is impossible to perform a stable control. It is possible to suppress the surge by using a SWEEP control of the DUTY ratio, but in some cases, it is difficult to obtain a sufficient effect depending on the rotation speed of the three-phase motor.

Thus, a need exists for a motor control device which is not susceptible to the drawback mentioned above.

SUMMARY

A feature of a motor control device according to an aspect of this disclosure resides in that the motor control device includes: a PWM controller that PWM-controls an inverter that drives a three-phase motor and includes three arm portions, each of which includes a high-side switching element and a low-side switching element connected in series with each other between a first power supply line and a second power supply line connected to a potential lower than a potential of the first power supply line. In an energizing period during which one of the high-side switching element and the low-side switching element included in one arm portion among the three arm portions is in a closed state in a case where the three-phase motor is energized from the first power supply line through a PWM-control of the inverter, and a non-energizing period during which both the high-side switching element and the low-side switching element included in the one arm portion are in an open state in a case where the three-phase motor is energized from the first power supply line through the PWM-control of the inverter, during a first predetermined period in the energizing period immediately before transition from the energizing period to the non-energizing period, the PWM controller performs a SWEEP control to gradually reduce an ON DUTY of a signal applied to one of the high-side switching element and the low-side switching element of the arm portion, and performs a synchronous rectification control such that the other of the high-side switching element and the low-side switching element of the arm portion is put in a closed state when one of the high-side switching element and the low-side switching element of another arm portion different from the arm portion including one of the high-side switching element and the low-side switching element (on which the SWEEP control is performed during the PWM-control in which the three-phase motor is energized from the first power supply line) is in an open state.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

A motor control device disclosed here is configured to have a function of suppressing a surge regardless of the rotation speed of a three-phase motor. Hereinafter, a motor control device 1 according to the embodiment will be described.

Figure 1:
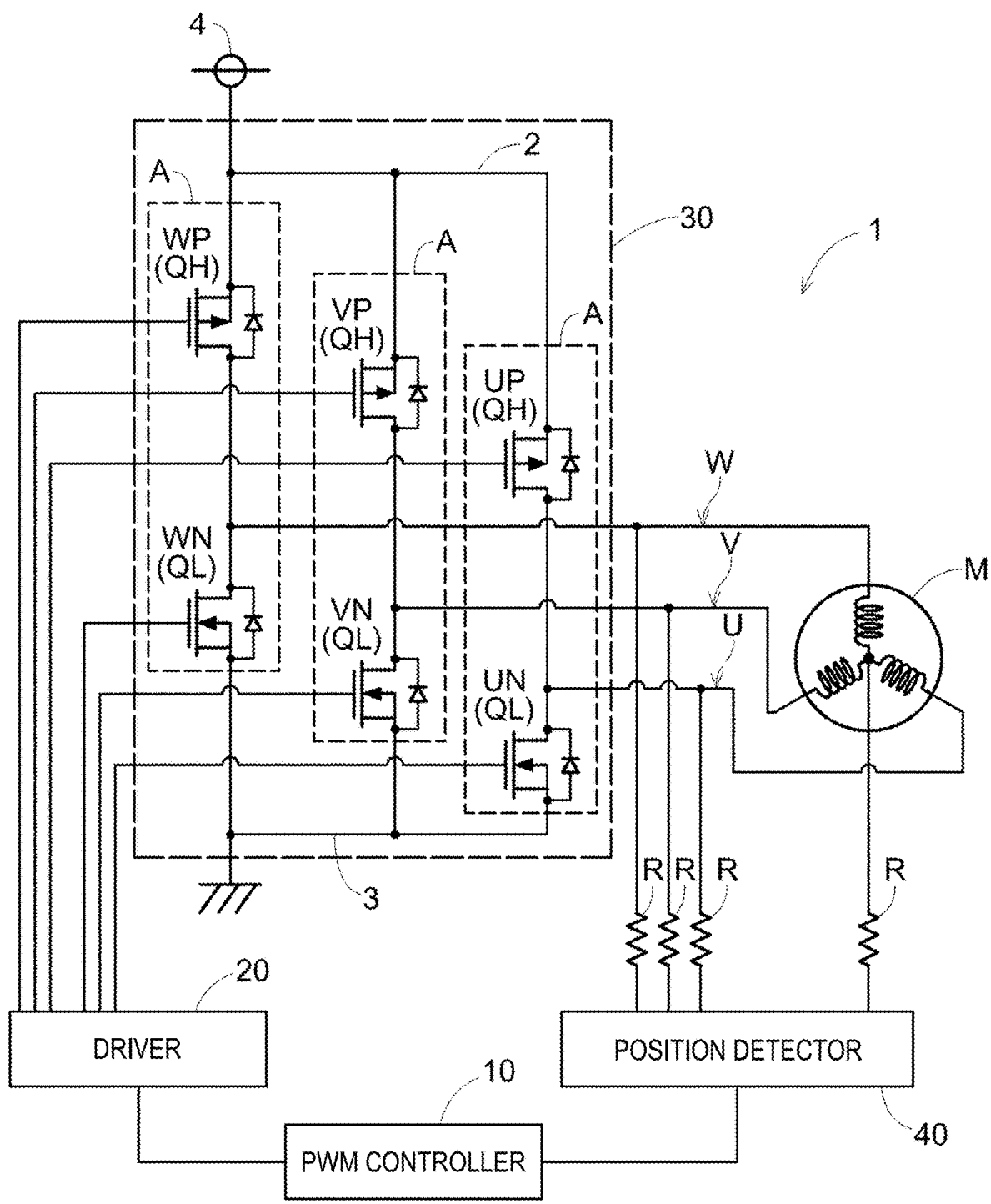
FIG. 1 is a block diagram schematically illustrating the configuration of a motor control device.

FIG. 1 is a block diagram schematically illustrating the configuration of the motor control device 1. The motor control device 1 is configured to include a PWM controller 10, a driver 20, an inverter 30, and a position detector 40.

The PWM controller 10 generates a PWM signal, and PWM-controls the inverter 30 to be described below. The PWM-control by a PWM signal is known in the related art and thus descriptions thereof will be omitted.

The driver 20 is provided between the PWM controller 10 and the inverter 30, and the PWM signal generated by the PWM controller 10 is input to the driver 20. The driver 20 improves a drive capability of the input PWM signal, and outputs the PWM signal to the inverter 30.

The inverter 30 controls a current flowing through a three-phase motor M, and drives the three-phase motor M. In the embodiment, the three-phase motor M is configured by a star connection as an example as illustrated in FIG. 1, but may be configured by a different connection such as a delta connection.

The inverter 30 includes three arm portions A, each of which includes a high-side switching element QH and a low-side switching element QL connected in series with each other between a first power supply line 2 and a second power supply line 3 connected to a potential lower than a potential of the corresponding first power supply line 2. The first power supply line 2 is a cable connected to a power supply 4. The second power supply line 3 connected to a potential lower than a potential of the first power supply line 2 is a cable to which a potential lower than an output voltage of the power supply 4 is applied, and corresponds to a grounded cable in the embodiment.

In the embodiment, the high-side switching element QH is configured using a P-MOSFET, and the low-side switching element QL is configured using an N-MOSFET. In the high-side switching element QH, a source terminal is connected to the first power supply line 2, and a drain terminal is connected to a drain terminal of the low-side switching element QL. A source terminal of the low-side switching element QL is connected to the second power supply line 3. The high-side switching element QH and the low-side switching element QL connected in this manner constitute the arm portion A, and the inverter 30 includes three arm portions A. A gate terminal of each of the high-side switching element QH and the low-side switching element QL is connected to the driver 20, and the above described PWM signal having an improved drive capability is input to the gate terminal. The drain terminal of the high-side switching element QH of each arm portion A is connected to each of three terminals included in the three-phase motor M.

The position detector 40 detects the position of a rotor (not illustrated) of the three-phase motor M based on a motor current flowing through the three-phase motor M. In the embodiment, the position detector 40 is connected to a cable that connects the drain terminal of the high-side switching element QH of each arm portion A as described above to each of the three terminals included in the three-phase motor M, through a resistor R. The position detector 40 is also connected to a neutral point in the star connection, through a resistor R. Such a connection makes it possible for the position detector 40 to detect a motor current and to detect (calculate) a position of the rotor. This detection is known in the related art and thus descriptions thereof will be omitted. The detection result of the position detector 40 is transferred to the PWM controller 10, and the PWM controller 10 uses the detection result in the PWM-control.

Hereinafter, descriptions will be made on a suppression of surge and heat generation by the PWM controller 10. In an energizing period between the energizing period and a non-energizing period, during a first predetermined period immediately before transition from the energizing period to the non-energizing period, the PWM controller 10 performs a SWEEP control to gradually reduce the ON DUTY of a signal applied to one of the high-side switching element QH and the low-side switching element QL of the arm portion A immediately before the transition from the corresponding energizing period to the non-energizing period.

Here, as the PWM-control, for example, there are a high-side PWM-control method that PWM-controls the high-side switching element QH between the high-side switching element QH and the low-side switching element QL, and a low-side PWM-control method that PWM-controls the low-side switching element QL between the high-side switching element QH and the low-side switching element QL.

Figure 2:
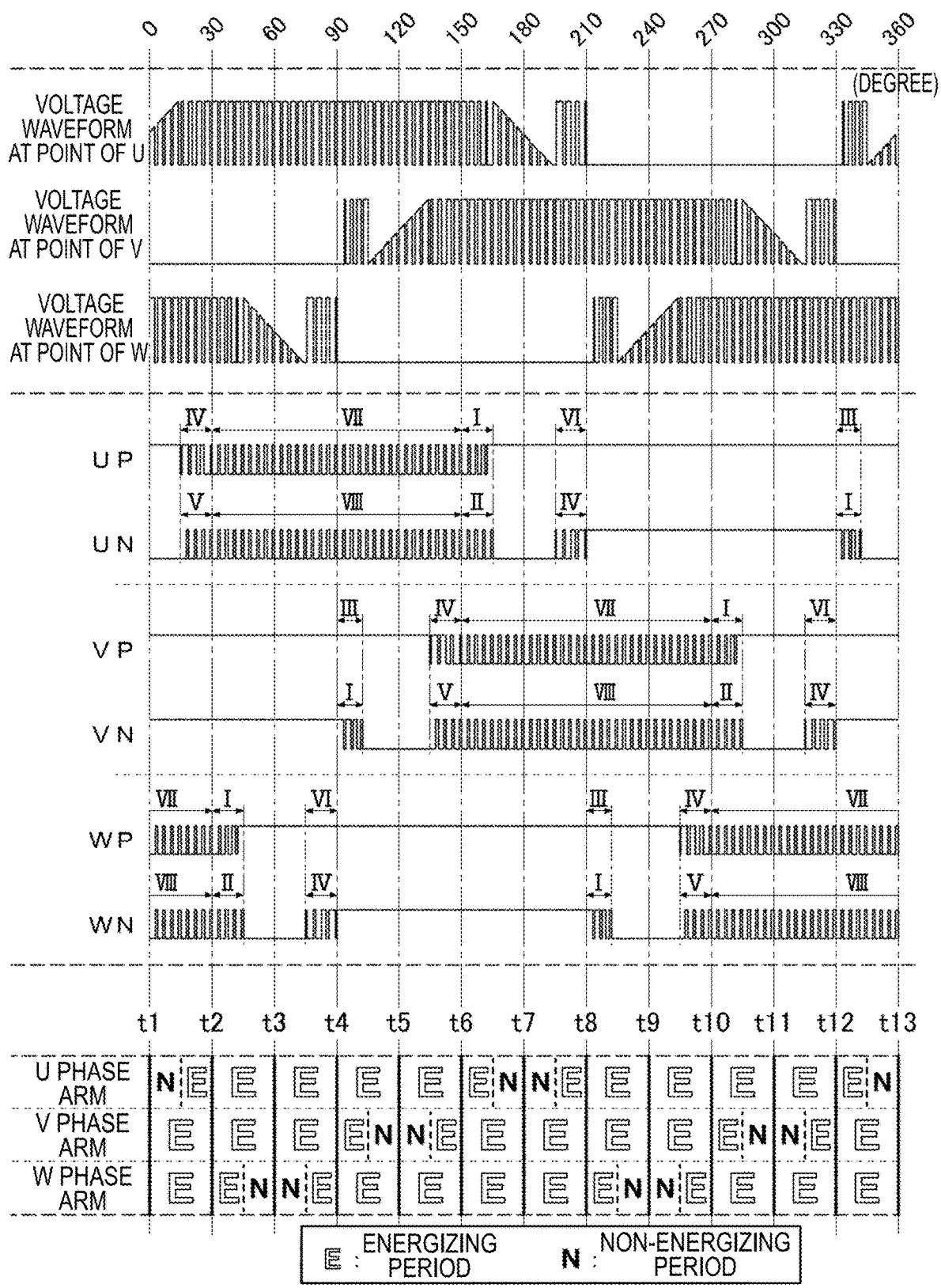
FIG. 2 is a view illustrating a waveform of each portion when a PWM-control is performed through a 150-degree energization drive by a high-side PWM-control method.

FIG. 2 illustrates a waveform of each portion when a PWM-control is performed through a 150-degree energization drive by the high-side PWM-control method. Specifically, a voltage waveform at each of U, V, and W points in FIG. 1, and a control signal input to a control terminal of each of the high-side switching element QH and the low-side switching element QL (a gate terminal in the example of FIG. 1) are illustrated. Hereinafter, when it is necessary to distinguish respective switching elements of respective arm portions A from each other, a high-side switching element QH of a U-phase arm portion A will be described as a high-side switching element UP, and a low-side switching element QL of the U-phase arm portion A will be described as a low-side switching element UN. A high-side switching element QH of a V-phase arm portion A will be described as a high-side switching element VP, and a low-side switching element QL of the V-phase arm portion A will be described as a low-side switching element VN. A high-side switching element QH of a W-phase arm portion A will be described as a high-side switching element WP, and a low-side switching element QL of the W-phase arm portion A will be described as a low-side switching element WN.

The energizing period is a period during which in a case where the inverter 30 is PWM-controlled so as to energize the three-phase motor M from the first power supply line 2, one of the high-side switching element QH and the low-side switching element QL included in one arm portion A among the three arm portions A is in a closed state. The phrase "a case where the inverter 30 is PWM-controlled so as to energize the three-phase motor M from the first power supply line 2" refers to a case where a current is caused to flow through the first power supply line 2 from the power supply 4 to coil of each phase of the three-phase motor M in order to drive the three-phase motor M. The phrase "one of the high-side switching element QH and the low-side switching element QL is in a closed state" means that one of the high-side switching element QH and the low-side switching element QL is in a conductive state.

Therefore, specifically, when attention is paid to the U-phase arm portion A, as indicated by the symbol "E" in FIG. 2 in the embodiment, the period during which one of the high-side switching element QH and the low-side switching element QL included in one arm portion A among the three arm portions A is in a closed state, in a case where the inverter 30 is PWM-controlled so as to energize the three-phase motor M from the first power supply line 2, corresponds to a period between 15° and 30° between time t1 and time t2, between time t2 and time t3, between time t3 and time t4, between time t4 and time t5, between time t5 and time t6, between 150° and 165° between time t6 and time t7, between 195° and 210° between time t7 and time t8, between time t8 and time t9, between time t9 and time t10, between time t10 and time t11, between time t11 and time t12, and between 330° and 345° between time t12 and time t13. These periods are referred to as energizing periods because one of the high-side switching element UP and the low-side switching element UN included in the U-phase arm portion A is in an energized state so that the three-phase motor M is energized from the first power supply line 2 through a PWM-control of the inverter 30.

The non-energizing period is a period during which in a case where the inverter 30 is PWM-controlled so as to energize the three-phase motor M from the first power supply line 2, both the high-side switching element QH and the low-side switching element QL included in one arm portion A among the three arm portions A are in an open state. As described above, the phrase "a case where the inverter 30 is PWM-controlled so as to energize the three-phase motor M from the first power supply line 2" refers to a case where a current is caused to flow through the first power supply line 2 from the power supply 4 to coil of each phase of the three-phase motor M in order to drive the three-phase motor M. The phrase "both the high-side switching element QH and the low-side switching element QL are in an open state" means that both the high-side switching element QH and the low-side switching element QL are in a non-conductive state.

Therefore, specifically, when attention is paid to the U-phase arm portion A, as indicated by the symbol "N" in FIG. 2 in the embodiment, the period during which both the high-side switching element QH and the low-side switching element QL included in one arm portion A among the three arm portions A are in an open state, in a case where the inverter 30 is PWM-controlled so as to energize the three-phase motor M from the first power supply line 2, corresponds to a period between 0° and 15° between time t1 and time t2, between 165° and 180° between time t6 and time t7, between 180° and 195° between time t7 and time t8, and between 345° and 360° between time t12 and time t13. These periods are referred to as non-energizing periods because both the high-side switching element UP and the low-side switching element UN included in the U-phase arm portion A are in a non-energized state so that the three-phase motor M is energized from the first power supply line 2 through a PWM-control of the inverter 30.

These energizing and non-energizing periods are individually set in the V-phase arm portion A and the W-phase arm portion A as well. That is, in the V-phase arm portion A, the energizing period corresponds to a period between time t1 and time t2, between time t2 and time t3, between time t3 and time t4, between 90° and 105° between time t4 and time t5, between 135° and 150° between time t5 and time t6, between time t6 and time t7, between time t7 and time t8, between time t8 and time t9, between time t9 and time t10, between 270° and 285° between time t10 and time t11, between 315° and 330° between time t11 and time t12, and between time t12 and time t13 in FIG. 2. Also, the non-energizing period corresponds to a period between 105° and 120° between time t4 and time t5, between 120° and 135° between time t5 and time t6, between 285° and 300° between time t10 and time t11, and between 300° and 315° between time t11 and time t12.

In the W-phase arm portion A, the energizing period corresponds to a period between time t1 and time t2, between 30° and 45° between time t2 and time t3, between 75° and 90° between time t3 and time t4, between time t4 and time t5, between time t5 and time t6, between time t6 and time t7, between time t7 and time t8, between 210° and 225° between time t8 and time t9, between 255° and 270° between time t9 and time t10, between time t10 and time t11, between time t11 and time t12, and between time t12 and time t13 as illustrated in FIG. 2. Also, the non-energizing period corresponds to a period between 45° and 60° between time t2 and time t3, between 60° and 75° between time t3 and time t4, between 225° and 240° between time t8 and time t9, and between 240° and 255° between time t9 and time t10.

When attention is paid to the U-phase arm portion A, the phrase "In an energizing period, . . . a first predetermined period immediately before transition from the energizing period to the non-energizing period" refers to a period immediately after time t6 has come between time t6 and time t7, and a period immediately after time t12 has come between time t12 and time t13. When attention is paid to the V-phase arm portion A, the first predetermined period is a period immediately after time t4 has come between time t4 and time t5, and a period immediately after time t10 has come between time t10 and time t11. When attention is paid to the W-phase arm portion A, the first predetermined period is a period immediately after time t2 has come between time t2 and time t3, and a period immediately after time t8 has come between time t8 and time t9. In the embodiment, each first predetermined period is set to half the length of a period including the first predetermined period (set to a length of 15°).

Therefore, the phrase "a SWEEP control to gradually reduce the ON DUTY of a signal applied to one of the high-side switching element QH and the low-side switching element QL of the arm portion A" means that in an energizing period including the first predetermined period among the states of the above described energizing period, a control is performed so as to gradually shorten a time during which one of the high-side switching element QH and the low-side switching element QL of the arm portion A is in a closed state. As described above, in the embodiment, the high-side switching element QH is configured using a P-MOSFET, and the low-side switching element QL is configured using an N-MOSFET. Therefore, in the embodiment, a case of gradually reducing the ON DUTY of a signal applied to the high-side switching element QH indicates that a low level period of the signal applied to the high-side switching element QH is gradually made shorter, and a case of gradually reducing the ON DUTY of a signal applied to the low-side switching element QL indicates that a high level period of the signal applied to the low-side switching element QL is gradually made shorter.

The PWM controller 10 performs a SWEEP control so as to gradually shorten a low level period of a signal applied to the high-side switching element WP of the W-phase arm portion A in a first predetermined period between time t2 and time t3, performs a SWEEP control so as to gradually shorten a high level period of a signal applied to the low-side switching element VN of the V-phase arm portion A in a first predetermined period between time t4 and time t5, performs a SWEEP control so as to gradually shorten a low level period of a signal applied to the high-side switching element UP of the U-phase arm portion A in a first predetermined period between time t6 and time t7, performs a SWEEP control so as to gradually shorten a high level period of a signal applied to the low-side switching element WN of the W-phase arm portion A in a first predetermined period between time t8 and time t9, performs a SWEEP control so as to gradually shorten a low level period of a signal applied to the high-side switching element VP of the V-phase arm portion A in a first predetermined period between time t10 and time t11, and performs a SWEEP control so as to gradually shorten a high level period of a signal applied to the low-side switching element UN of the U-phase arm portion A in a first predetermined period between time t12 and time t13. In FIG. 2, these periods during which SWEEP controls are performed are indicated by the symbol "I."

In each first predetermined period, the PWM controller 10 performs a synchronous rectification control such that the other of the high-side switching element QH and the low-side switching element QL of the arm portion A is placed in a closed state when one of the high-side switching element QH and the low-side switching element QL of another arm portion A different from the arm portion A including one of the high-side switching element QH and the low-side switching element QL (on which the SWEEP control is performed during the PWM-control in which the three-phase motor M is energized from the first power supply line 2) is in an open state.

The phrase "each first predetermined period" refers to a period during which the SWEEP control is performed on one of the high-side switching element QH and the low-side switching element QL of each arm portion A as described above, and the phrase "arm portion A" corresponds to the arm portion A including one of the high-side switching element QH and the low-side switching element QL on which the SWEEP control is performed in the first predetermined period. Therefore, the phrase "in each first predetermined period, . . . the other of the high-side switching element QH and the low-side switching element QL of the arm portion A" refers to the other switching element that constitutes the arm portion A together with one of the high-side switching element QH and the low-side switching element QL on which the SWEEP control is performed in the first predetermined period.

The phrase "another arm portion A different from the arm portion A including one of the high-side switching element QH and the low-side switching element QL" refers to each of two other arm portions A which is different from the arm portion A including a switching element on which the SWEEP control is performed, among the three arm portions A, and indicates an arm portion A in an energizing period state. Specifically, another arm portion A corresponds to each of the V-phase arm portion A and the W-phase arm portion A when the SWEEP control is performed on one of the high-side switching element UP and the low-side switching element UN of the U-phase arm portion A, corresponds to each of the U-phase arm portion A and the W-phase arm portion A when the SWEEP control is performed on one of the high-side switching element VP and the low-side switching element VN of the V-phase arm portion A, and corresponds to each of the U-phase arm portion A and the V-phase arm portion A when the SWEEP control is performed on one of the high-side switching element WP and the low-side switching element WN of the W-phase arm portion A.

The phrase "performs a synchronous rectification control of setting a closed state when one of the high-side switching element QH and the low-side switching element QL of another arm portion A is in an open state" indicates that during the PWM-control performed on the inverter 30 so as to energize the three-phase motor M from the first power supply line 2, when a switching element of another arm portion A is in an open state, the other switching element of the arm portion A including the switching element on which the SWEEP control is performed is placed in a closed state, and such a control is called a synchronous rectification control.

Specifically, in the first predetermined period between time t2 and time t3, the low-side switching element WN constituting the arm portion A together with the W-phase high-side switching element WP on which the SWEEP control is performed is placed in a closed state when the high-side switching element UP of the U-phase arm portion A on which the PWM-control is performed so as to energize the three-phase motor M from the first power supply line 2 is in an open state. In the first predetermined period between time t6 and time t7, the low-side switching element UN constituting the arm portion A together with the U-phase high-side switching element UP on which the SWEEP control is performed is placed in a closed state when the high-side switching element VP of the V-phase arm portion A on which the PWM-control is performed so as to energize the three-phase motor M from the first power supply line 2 is in an open state. In the first predetermined period between time t10 and time t11, the low-side switching element VN constituting the arm portion A together with the V-phase high-side switching element VP on which the SWEEP control is performed is placed in a closed state when the high-side switching element WP of the W-phase arm portion A on which the PWM-control is performed so as to energize the three-phase motor M from the first power supply line 2 is in an open state. Accordingly, it is possible to regenerate a regenerative current without using a diode included in each switching element. In FIG. 2, these periods during which synchronous rectification controls are performed are indicated by the symbol "II."

Here, in the embodiment, exemplified is a case in which the PWM-control is performed by a high-side PWM-control method that PWM-controls the high-side switching element QH between the high-side switching element QH and the low-side switching element QL. That is, the high-side PWM-control method refers to a method in which in a case where the three-phase motor M is energized from the first power supply line 2, with respect to the high-side switching element QH of each arm portion A, open/closed states are switched with a signal that periodically changes in one energizing period, whereas the low-side switching element QL of each arm portion A is placed in a closed state with a constant level signal that does not periodically change in one energizing period.

In such a case, the PWM controller 10 is configured not to perform a synchronous rectification control on the high-side switching element QH when the SWEEP control is performed on the low-side switching element QL. That is, in the first predetermined period between time t4 and time t5, since the SWEEP control is performed on the V-phase low-side switching element VN, a synchronous rectification control is not performed on the high-side switching element VP constituting the arm portion A together with the low-side switching element VN, and the high-side switching element VP is placed in an open state. In the first predetermined period between time t8 and time t9, since the SWEEP control is performed on the W-phase low-side switching element WN, a synchronous rectification control is not performed on the high-side switching element WP constituting the arm portion A together with the low-side switching element WN, and the high-side switching element WP is placed in an open state. In the first predetermined period between time t12 and time t13, since the SWEEP control is performed on the U-phase low-side switching element UN, a synchronous rectification control is not performed on the high-side switching element UP constituting the arm portion A together with the low-side switching element UN, and the high-side switching element UP is placed in an open state. In FIG. 2, these periods during which synchronous rectification controls are not performed are indicated by the symbol "III."

In the embodiment, in the energizing period, during a second predetermined period immediately after transition from the non-energizing period to the energizing period, the PWM controller 10 performs a SWEEP control to gradually increase the ON DUTY of a signal applied to one of the high-side switching element QH and the low-side switching element QL of the arm portion A immediately after the transition from the corresponding non-energizing period to the energizing period.

When attention is paid to the U-phase arm portion A, the phrase "in the energizing period, . . . a second predetermined period immediately after transition from the non-energizing period to the energizing period" refers to a period immediately before time t2 has come between time t1 and time t2, and a period immediately before time t8 has come between time t7 and time t8. When attention is paid to the V-phase arm portion A, the second predetermined period is a period immediately before time t6 has come between time t5 and time t6, and a period immediately before time t12 has come between time t11 and time t12. When attention is paid to the W-phase arm portion A, the second predetermined period is a period immediately before time t4 has come between time t3 and time t4, and a period immediately before time t10 has come between time t9 and time t10. In the embodiment, each second predetermined period is set to half the length of a period including the second predetermined period (set to a length of 15°).

The phrase "to gradually increase the ON DUTY of a signal applied to one of the high-side switching element QH and the low-side switching element QL of the arm portion A" means gradually increasing a time during which one of the high-side switching element QH and the low-side switching element QL of the arm portion A in an energizing period state is in a closed state. Therefore, in the embodiment, a case of gradually increasing the ON DUTY of a signal applied to the high-side switching element QH indicates that a low level period of the signal applied to the high-side switching element QH is gradually made longer, and a case of gradually increasing the ON DUTY of a signal applied to the low-side switching element QL indicates that a high level period of the signal applied to the low-side switching element QL is gradually made longer.

The PWM controller 10 performs a SWEEP control so as to gradually increase a low level period of a signal applied to the U-phase high-side switching element UP in a second predetermined period between time t1 and time t2, performs a SWEEP control so as to gradually increase a high level period of a signal applied to the W-phase low-side switching element WN in a second predetermined period between time t3 and time t4, performs a SWEEP control so as to gradually increase a low level period of a signal applied to the V-phase high-side switching element VP in a second predetermined period between time t5 and time t6, performs a SWEEP control so as to gradually increase a high level period of a signal applied to the U-phase low-side switching element UN in a second predetermined period between time t7 and time t8, performs a SWEEP control so as to gradually increase a low level period of a signal applied to the W-phase high-side switching element WP in a second predetermined period between time t9 and time t10, and performs a SWEEP control so as to gradually increase a high level period of a signal applied to the V-phase low-side switching element VN in a second predetermined period between time t11 and time t12. In FIG. 2, these periods during which SWEEP controls are performed are indicated by the symbol "IV."

In each second predetermined period, the PWM controller 10 performs a synchronous rectification control such that the other of the high-side switching element QH and the low-side switching element QL of the arm portion A is placed in a closed state when one of the high-side switching element QH and the low-side switching element QL of another arm portion A is in an open state.

The phrase "each second predetermined period" refers to a period during which the SWEEP control is performed on one of the high-side switching element QH and the low-side switching element QL of each arm portion A as described above, and the phrase "arm portion A" corresponds to the arm portion A including one of the high-side switching element QH and the low-side switching element QL on which the SWEEP control is performed in the second predetermined period. Therefore, the phrase "In each second predetermined period, . . . the other of the high-side switching element QH and the low-side switching element QL of the arm portion A" refers to a switching element that constitutes the arm portion A together with one of the high-side switching element QH and the low-side switching element QL on which the SWEEP control is performed in the second predetermined period.

Specifically, in the second predetermined period between time t1 and time t2, the low-side switching element UN constituting the arm portion A together with the U-phase high-side switching element UP on which the SWEEP control is performed is placed in a closed state when the high-side switching element WP of the W-phase arm portion A on which the PWM-control is performed so as to energize the three-phase motor M from the first power supply line 2 is in an open state. In the second predetermined period between time t5 and time t6, the low-side switching element VN constituting the arm portion A together with the V-phase high-side switching element VP on which the SWEEP control is performed is placed in a closed state when the high-side switching element UP of the U-phase arm portion A on which the PWM-control is performed so as to energize the three-phase motor M from the first power supply line 2 is in an open state. In the second predetermined period between time t9 and time t10, the W-phase low-side switching element WN constituting the arm portion A together with the high-side switching element WP on which the SWEEP control is performed is placed in a closed state when the high-side switching element VP of the V-phase arm portion A on which the PWM-control is performed so as to energize the three-phase motor M from the first power supply line 2 is in an open state. Accordingly, it is possible to regenerate a regenerative current without using a diode included in each switching element. In FIG. 2, these periods during which synchronous rectification controls are performed are indicated by the symbol "V."

In the second predetermined period as well, the PWM controller 10 is configured not to perform a synchronous rectification control on the high-side switching element QH when the SWEEP control is performed on the low-side switching element QL. That is, in the second predetermined period between time t3 and time t4, since the SWEEP control is performed on the W-phase low-side switching element WN, a synchronous rectification control is not performed on the high-side switching element WP constituting the arm portion A together with the low-side switching element WN, and the high-side switching element WP is in an open state. In the second predetermined period between time t7 and time t8, since the SWEEP control is performed on the U-phase low-side switching element UN, a synchronous rectification control is not performed on the high-side switching element UP constituting the arm portion A together with the low-side switching element UN, and the high-side switching element UP is in an open state. In the second predetermined period between time t11 and time t12, since the SWEEP control is performed on the V-phase low-side switching element VN, a synchronous rectification control is not performed on the high-side switching element VP constituting the arm portion A together with the low-side switching element VN, and the high-side switching element VP is in an open state. In FIG. 2, these periods during which synchronous rectification controls are not performed are indicated by the symbol "VI."

In the embodiment, in the energizing period in a case where the three-phase motor M is energized from the first power supply line 2 through the PWM-control of the inverter 30, when the high-side switching element QH included in one arm portion A among the three arm portions A is in an open state, the PWM controller 10 places the low-side switching element QL constituting the arm portion A together with the corresponding high-side switching element QH in a closed state.

Specifically, in each of the energizing periods between time t2 and time t6, since the PWM-control is performed on the U-phase high-side switching element UP so as to energize the three-phase motor M from the first power supply line 2, when the high-side switching element UP is in an open state, the low-side switching element UN constituting the arm portion A together with the high-side switching element UP is in a closed state. In each of the energizing periods between time t6 and time t10, since the PWM-control is performed on the V-phase high-side switching element VP so as to energize the three-phase motor M from the first power supply line 2, when the high-side switching element VP is in an open state, the low-side switching element VN constituting the arm portion A together with the high-side switching element VP is in a closed state. In each of the energizing periods between time t1 and time t2 and between time t10 and time t13, since the PWM-control is performed on the W-phase high-side switching element WP so as to energize the three-phase motor M from the first power supply line 2, when the high-side switching element WP is in an open state, the low-side switching element WN constituting the arm portion A together with the high-side switching element WP is in a closed state. Accordingly, it is possible to regenerate a regenerative current without using a diode included in each switching element. In FIG. 2, these periods during which PWM-controls are performed are indicated by the symbol "VII," and these periods during which synchronous rectification controls are performed are indicated by the symbol "VIII."

Figure 3:
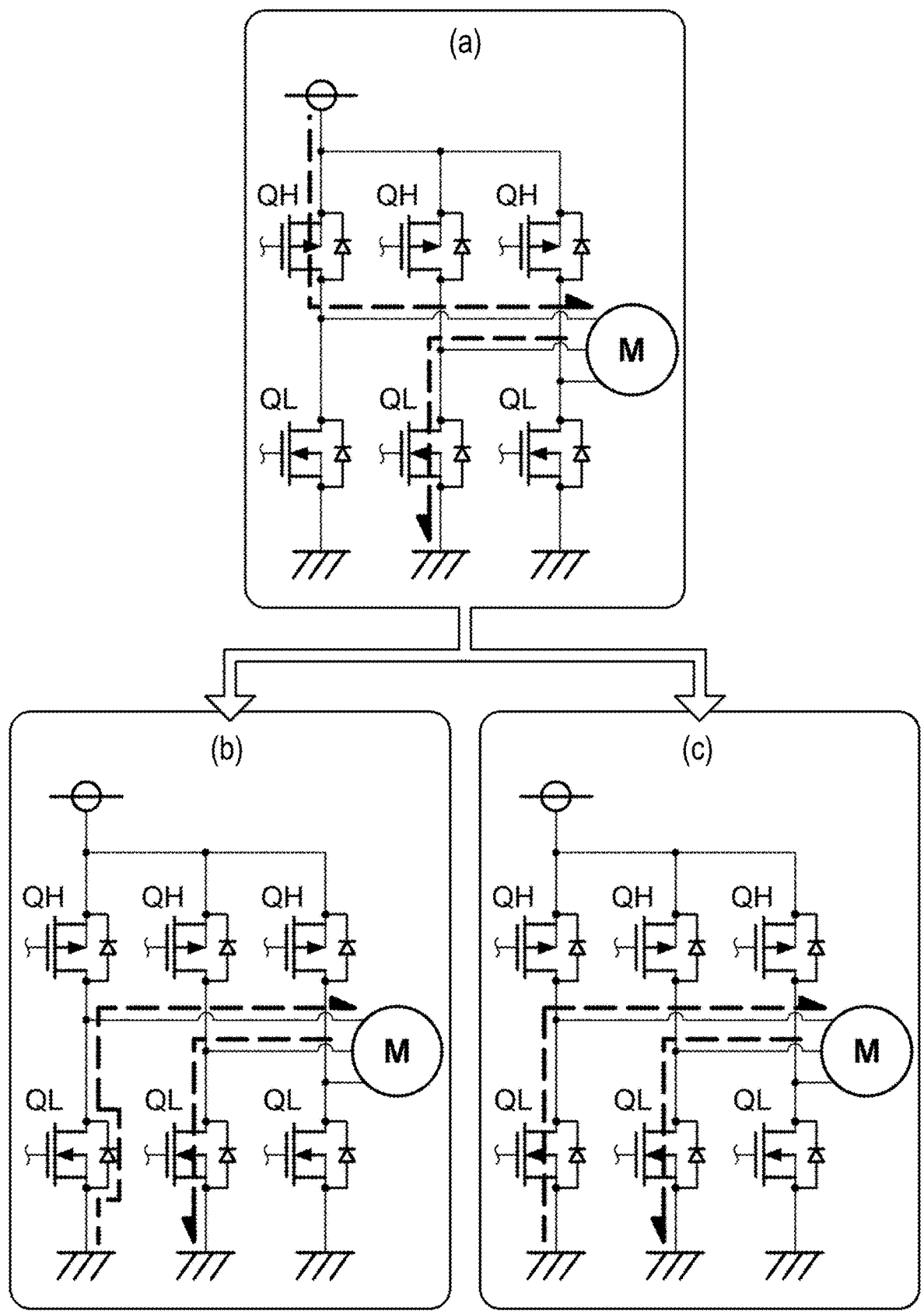
FIG. 3 shows views illustrating a synchronous rectification control.

After the three-phase motor M is energized by a PWM-control as illustrated in (a) in FIG. 3, in a technology of the related art, a regenerative current flows through a diode provided in parallel to the low-side switching element QL as illustrated in (b) in FIG. 3. However, through the configuration as described above, in the present motor control device 1, at the time of regeneration, the low-side switching element QL is placed in a closed state so that a regenerative current may be caused to flow through the low-side switching element QL as illustrated in (c) in FIG. 3. Since power loss caused by the ON resistance of the low-side switching element QL is smaller than power loss caused by the forward voltage of the diode, it is possible to reduce the amount of heat generation at the time of regeneration.

Figure 4:
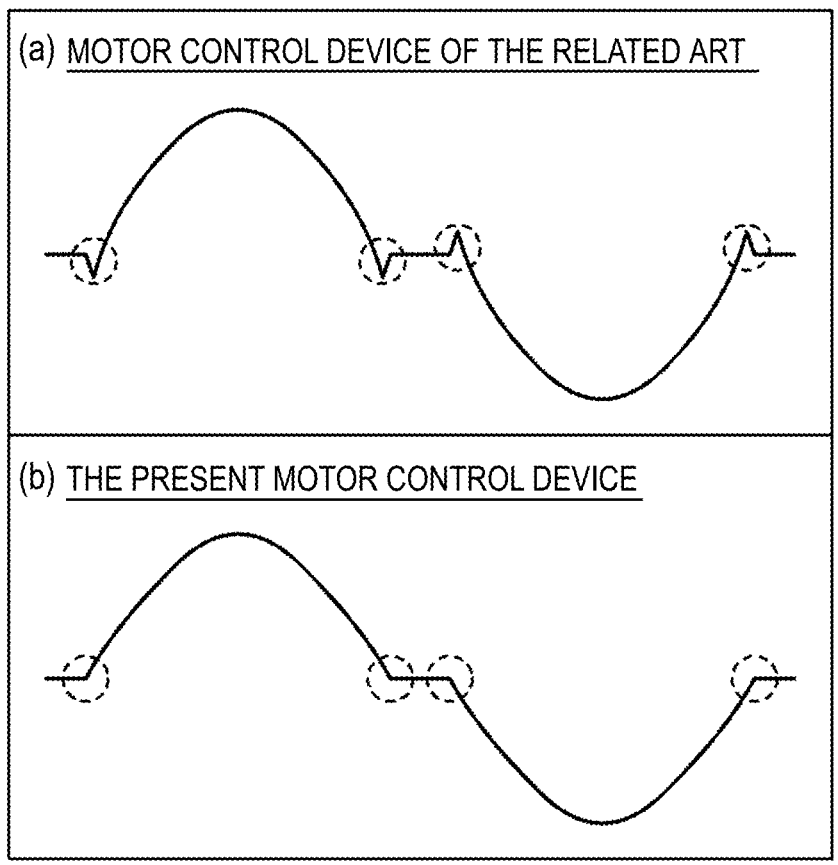
FIG. 4 illustrates a current waveform of a phase current.

In a control by a motor control device of the related art, as illustrated in (a) in FIG. 4, an unintentional current is superimposed on a phase current when an energizing period is switched to a non-energizing period. Whereas, according to the present motor control device 1, as illustrated in (b) in FIG. 4, it is possible to prevent an unintentional current from being superimposed. Further, since the unintentional current does not flow through the three-phase motor M (is not superimposed), it is possible to suppress an abnormal noise from occurring by driving of the three-phase motor M due to the corresponding current. Therefore, according to the present motor control device 1, it is possible to achieve noise reduction at the time of driving of the three-phase motor M.

Other Embodiments

In the above embodiment, descriptions have been made on a waveform of each portion in a case where the PWM-control is performed through the 150-degree energization drive by the high-side PWM-control method, as an example. However, as in the 150-degree energization drive, application to an energization method in which an energizing period wraps up other phases is possible.

In the above embodiment, descriptions have been made on a case where during the second predetermined period immediately after the transition from the non-energizing period to the energizing period, in the energizing period, the PWM controller 10 performs the SWEEP control to gradually increase the ON DUTY of the signal applied to one of the high-side switching element QH and the low-side switching element QL of the arm portion A immediately after the transition from the corresponding non-energizing period to the energizing period, and performs the synchronous rectification control such that the other of the high-side switching element QH and the low-side switching element QL is placed in a closed state when one of the high-side switching element QH and the low-side switching element QL of another arm portion A is in an open state. However, the PWM controller 10 may also be configured to perform neither the SWEEP control nor the synchronous rectification control in the corresponding second predetermined period.

In the above embodiment, descriptions have been made on a case where the PWM controller 10 performs the PWM-control through the high-side PWM-control method that PWM-controls the high-side switching element QH between the high-side switching element QH and the low-side switching element QL, as an example. However, it is also possible to apply the present disclosure to a case where the PWM controller 10 performs the PWM-control through a low-side PWM-control method that PWM-controls the low-side switching element QL between the high-side switching element QH and the low-side switching element QL. In such a case, the PWM controller 10 may be configured not to perform a synchronous rectification control on the low-side switching element QL when a SWEEP control is performed on the high-side switching element QH.

It is possible to use the present disclosure in a motor control device including a PWM controller PWM-controlling an inverter that drives a three-phase motor, and includes three arm portions, each of which includes a high-side switching element and a low-side switching element connected in series with each other between a first power supply line and a second power supply line connected to a potential lower than a potential of the corresponding first power supply line.

A feature of a motor control device according to an aspect of this disclosure resides in that the motor control device includes: a PWM controller that PWM-controls an inverter that drives a three-phase motor and includes three arm portions, each of which includes a high-side switching element and a low-side switching element connected in series with each other between a first power supply line and a second power supply line connected to a potential lower than a potential of the first power supply line. In an energizing period during which one of the high-side switching element and the low-side switching element included in one arm portion among the three arm portions is in a closed state in a case where the three-phase motor is energized from the first power supply line through a PWM-control of the inverter, and a non-energizing period during which both the high-side switching element and the low-side switching element included in the one arm portion are in an open state in a case where the three-phase motor is energized from the first power supply line through the PWM-control of the inverter, during a first predetermined period in the energizing period immediately before transition from the energizing period to the non-energizing period, the PWM controller performs a SWEEP control to gradually reduce an ON DUTY of a signal applied to one of the high-side switching element and the low-side switching element of the arm portion, and performs a synchronous rectification control such that the other of the high-side switching element and the low-side switching element of the arm portion is put in a closed state when one of the high-side switching element and the low-side switching element of another arm portion different from the arm portion including one of the high-side switching element and the low-side switching element (on which the SWEEP control is performed during the PWM-control in which the three-phase motor is energized from the first power supply line) is in an open state.

According to the configuration described above, in a case where the SWEEP control and the synchronous rectification control are performed in combination, a switching element targeted for the synchronous rectification control is not placed in a closed state when one of the high-side switching element and the low-side switching element on which the SWEEP control is performed is in an open state. Instead, the switching element targeted for the synchronous rectification control is placed in a closed state when one of the high-side switching element and the low-side switching element of another arm portion different from the arm portion including one of the high-side switching element and the low-side switching element on which the SWEEP control is performed is in an open state. Accordingly, it is possible to prevent an unintentional current from flowing through the three-phase motor, and thus it is possible to implement suppression of heat generation by the synchronous rectification control as well as noise reduction and surge suppression by the SWEEP control.

It is preferable that, during a second predetermined period in the energizing period immediately after transition from the non-energizing period to the energizing period, the PWM controller performs the SWEEP control to gradually increase the ON DUTY of the signal applied to one of the high-side switching element and the low-side switching element of the arm portion, and performs a synchronous rectification control such that the other of the high-side switching element and the low-side switching element of the arm portion is put in a closed state when one of the high-side switching element and the low-side switching element of the another arm portion is in an open state.

According to the configuration described above, it is possible to further improve an effect of noise reduction and surge suppression by the SWEEP control, and an effect of suppressing heat generation by the synchronous rectification control.

It is preferable that, the PWM controller performs the PWM-control by a high-side PWM-control method that PWM-controls the high-side switching element between the high-side switching element and the low-side switching element, and does not perform the synchronous rectification control on the high-side switching element when the SWEEP control is performed on the low-side switching element.

According to the configuration described above, in a case where the PWM-control is performed by the high-side PWM-control method, it is possible to reliably prevent an unintentional current from being generated. Therefore, the effect by the SWEEP control and the effect by the synchronous rectification control as described above may be more easily improved.

It is preferable that, the PWM controller performs the PWM-control by a low-side PWM-control method that PWM-controls the low-side switching element between the high-side switching element and the low-side switching element, and does not perform the synchronous rectification control on the low-side switching element when the SWEEP control is performed on the high-side switching element.

According to the configuration described above, in a case where the PWM-control is performed by the low-side PWM-control method, it is possible to reliably prevent an unintentional current from being generated. Therefore, the effect by the SWEEP control and the effect by the synchronous rectification control as described above may be improved more easily.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A motor control device comprising:
a PWM controller that PWM-controls an inverter that drives a three-phase motor and includes three arm portions, each of which includes a high-side switching element and a low-side switching element connected in series with each other between a first power supply line and a second power supply line connected to a potential lower than a potential of the first power supply line,
wherein in an energizing period during which one of the high-side switching element and the low-side switching element included in one arm portion among the three arm portions is in a closed state in a case where the three-phase motor is energized from the first power supply line through a PWM-control of the inverter, and a non-energizing period during which both the high-side switching element and the low-side switching element included in the one arm portion are in an open state in a case where the three-phase motor is energized from the first power supply line through the PWM-control of the inverter, during a first predetermined period in the energizing period immediately before transition from the energizing period to the non-energizing period, the PWM controller performs a SWEEP control to gradually reduce an ON DUTY of a signal applied to one of the high-side switching element and the low-side switching element of the arm portion, and performs a synchronous rectification control such that the other of the high-side switching element and the low-side switching element of the arm portion is put in a closed state when one of the high-side switching element and the low-side switching element of another arm portion different from the arm portion including one of the high-side switching element and the low-side switching element on which the SWEEP control is performed during the PWM-control in which the three-phase motor is energized from the first power supply line is in an open state.

2. The motor control device according to claim 1, wherein during a second predetermined period in the energizing period immediately after transition from the non-energizing period to the energizing period, the PWM controller performs the SWEEP control to gradually increase the ON DUTY of the signal applied to one of the high-side switching element and the low-side switching element of the arm portion, and performs a synchronous rectification control such that the other of the high-side switching element and the low-side switching element of the arm portion is put in a closed state when one of the high-side switching element and the low-side switching element of the another arm portion is in an open state.

3. The motor control device according to claim 1, wherein the PWM controller
   performs the PWM-control by a high-side PWM-control method that PWM-controls the high-side switching element between the high-side switching element and the low-side switching element, and
   does not perform the synchronous rectification control on the high-side switching element when the SWEEP control is performed on the low-side switching element.

4. The motor control device according to claim 2, wherein the PWM controller
   performs the PWM-control by a high-side PWM-control method that PWM-controls the high-side switching element between the high-side switching element and the low-side switching element, and
   does not perform the synchronous rectification control on the high-side switching element when the SWEEP control is performed on the low-side switching element.

5. The motor control device according to claim 1, wherein the PWM controller
   performs the PWM-control by a low-side PWM-control method that PWM-controls the low-side switching element between the high-side switching element and the low-side switching element, and
   does not perform the synchronous rectification control on the low-side switching element when the SWEEP control is performed on the high-side switching element.

6. The motor control device according to claim 2, wherein the PWM controller
   performs the PWM-control by a low-side PWM-control method that PWM-controls the low-side switching element between the high-side switching element and the low-side switching element, and
   does not perform the synchronous rectification control on the low-side switching element when the SWEEP control is performed on the high-side switching element.

* * * * *